United States Patent [19]

Seita et al.

[11] 4,200,538

[45] * Apr. 29, 1980

[54] PROCESS FOR PREPARING CATION-EXCHANGE MEMBRANE

[75] Inventors: Toru Seita; Kenji Takahashi; Shunichi Asami; Akihiko Shimizu, all of Shin-nanyo, Japan

[73] Assignee: Toyo Soda Manufacturing Co. Ltd., Yamaguchi, Japan

[ * ] Notice: The portion of the term of this patent subsequent to Jan. 2, 1996, has been disclaimed.

[21] Appl. No.: 807,638

[22] Filed: Jun. 17, 1977

[30] Foreign Application Priority Data

Jul. 2, 1976 [JP] Japan .................................. 51-77908

[51] Int. Cl.$^2$ .................... C08F 259/08; C08F 265/02
[52] U.S. Cl. ........................... 210/500M; 204/159.17; 521/27
[58] Field of Search ............... 210/500 M, 23 H, 23 F, 210/321 R; 260/2.6 E, 2.2 R, 29.6 F, 884; 521/27; 204/159.17, 296, 180 P

[56] References Cited

U.S. PATENT DOCUMENTS

| | | | |
|---|---|---|---|
| 3,247,133 | 4/1966 | Chen | 260/2.1 F |
| 3,684,747 | 8/1972 | Coalson et al. | 260/2.5 R |
| 3,839,172 | 10/1974 | Chapiro et al. | 204/159.17 |
| 4,012,303 | 3/1977 | Agostino et al. | 204/159.17 |
| 4,045,352 | 8/1977 | Rembaum et al. | 260/2.1 E X |
| 4,132,682 | 1/1979 | Seita et al. | 521/27 |

FOREIGN PATENT DOCUMENTS

| | | | |
|---|---|---|---|
| 50-108182 | of 1975 | Japan | 210/500 M |
| 50-120492 | of 1975 | Japan | 210/500 M |
| 110619 | 2/1961 | Pakistan | 210/500 M |

*Primary Examiner*—Frank A. Spear, Jr.
*Attorney, Agent, or Firm*—Oblon, Fisher, Spivak, McClelland & Maier

[57] ABSTRACT

A cation-exchange membrane is prepared by swelling a fluorinated polymer membrane having cation-exchangeable groups with an organic solvent and then removing the solvent from the swollen membrane and immersing a monomer with or without a crosslinking agent and a polymerization initiator into it and polymerizing the monomer. The membrane is preferably swollen with a water miscible organic solvent and then, the solvent is removed from the membrane.

10 Claims, No Drawings

PROCESS FOR PREPARING CATION-EXCHANGE MEMBRANE

BACKGROUND OF THE INVENTION

1. Field of the Invention

The present invention relates to a process for preparing a cation-exchange membrane which has excellent electrical characteristics and cation selective permeability, chemical resistance, heat resistance and mechanical strength. More particularly, it relates to a process for preparing a cation-exchange membrane which is suitable as a diaphragm for electrolysis of an alkali metal halide.

2. Description of the Prior Art

Cation-exchange membranes have been used in various industries because of excellent electrical characteristics and cation selective permeability. For example, the cation-exchange membranes have been used as diaphragms for electric dialysis by combining it with an anion-exchange membrane or the other membrane, in a concentration of sea water for producing sodium chloride, a desalting of brine or sea water for producing fresh water; a recovery of useful metal salt from a waste water in a metal plating; a treatment of drainage; a purification of juice; a desalting of powdery milk; a treatment of waste solution containing radioactive material; a concentration of uranium and the other various purposes.

In the application of the cation-exchange membrane to these usages, various characteristics are required. The most important characteristics are the cation selective permeability and the durability.

Various efforts have been made for improving the ion selective permeability and the durability since the ion-exchange membrane has been found.

As the result, cation-exchange membranes made of styrenedivinylbenzene crosslinked polymer having sulfonic acid groups have been developed as the cation-exchange membrane, and the cation-exchange membranes having enough selective permeability and durability in many usages have been proposed.

However, the conditions using the ion-exchange membranes have been severe as the usages for the treatment of drainage and waste solution or the electrolysis of sodium chloride. Further improvement of the durability of the membrane has been required. The selective permeability of the ion-exchange membranes has not been satisfactory in some usages.

The conventional cation-exchange membranes have high resistance to the permeation of most of anions however, they have disadvantages to be remarkably high mobility of anions to the electrolyte aqueous solution containing hydroxyl group ions in comparison with the other cases.

The phenomenon is caused because the permeation of hydroxyl group ions can not be effectively prevented as the mobility of hydroxyl group ions in an aqueous solution is remarkably high in comparison with the other anions.

When the cation-exchange membrane is used in the condition containing hydroxyl group ions, for example it is used as a diaphragm for electrolysis of sodium chloride, the current efficiency is lowered disadvantageously because of the phenomenon.

Accordingly, it has been required to develop a cation-exchange membrane having high durability and high resistance to permeation of hydroxyl group ions in these usages of the cation-exchange membrane.

The inventors have studied to develop the cation-exchange membrane for satisfying the requirement of the durability and the permeation of hydroxyl group ions.

SUMMARY OF THE INVENTION

It is an object of the present invention to provide a process for preparing a cation-exchange membrane which has high durability and high selective permeability.

The foregoing and other objects of the present invention have been attained by swelling a fluorinated polymer membrane having cation-exchangeable groups with an organic solvent and then removing the solvent from the swollen membrane and immersing a monomer with or without a crosslinking agent and a polymerization initiator into it and polymerizing the monomer. The membrane is preferably swollen with a water miscible organic solvent and then, the solvent is removed from the membrane.

DETAILED DESCRIPTION OF THE PREFERRED EMBODIMENTS

The processes for preparing cation-exchange membranes by immersing vinyl monomer with or without a crosslinking agent into a cation-exchange membrane and then polymerizing the monomer have been disclosed in Japanese Patent Publication Nos. 108182/1975 and 120492/1975.

On the other hand, in the present invention, the cation-exchange membrane made of fluorinated polymer is swollen in an organic solvent and removing the solvent before immersing the monomer whereby the current efficiency is remarkably improved. When the resulting cation-exchange membrane is swollen with a water miscible organic solvent and then, the solvent is removed from the membrane, the effect is further improved. The process of the present invention is remarkably different from the conventional process for immersing the monomer into the cation-exchange membrane and polymerizing it.

The cation-exchange membranes used in the present invention can be fluorinated polymer membrane having cation-exchangeable groups such as sulfonic acid groups and carboxylic acid groups and derivatives thereof which can be prepared by polymerizing a fluorinated compound having the cation-exchangeable group with or without a comonomer and forming a membrane and then hydrolyzing it if necessary.

Typical fluorinated polymers having cation-exchangeable groups have the following units. The units may have groups which can be converted into cation-exchangeable groups.

(A) Sulfonic acid type fluorinated polymers

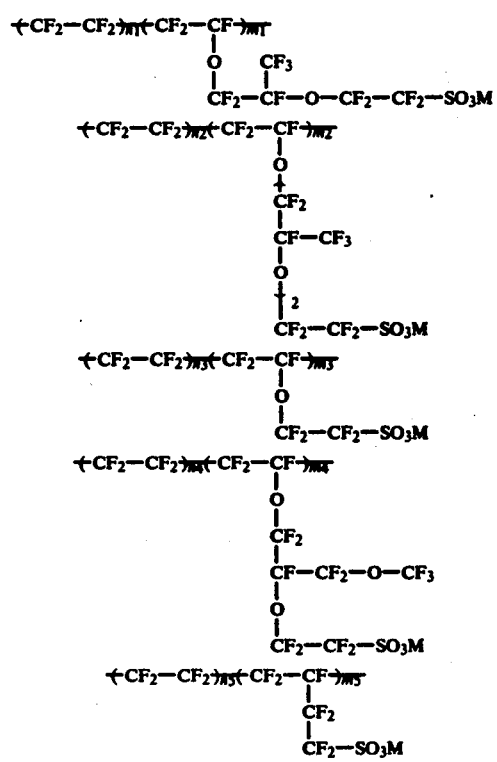

$X = -CF_3, -CF_2-O-CF_3$;
n=0 or 1 to 5;
m=0 or 1;
k/l=3-16 preferably 5-13.
M=H, NH$_4$, or alkali metal such as Na, K.
such as;

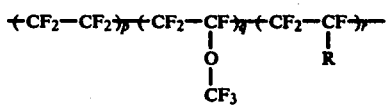 (1)

(2)

(3)

(4)

(5)

The copolymer have preferably sulfonic acid groups at a ratio of one per 700 to 2800 of molecular weight.

(B) Carboxylic acid type fluorinated polymers

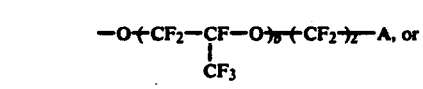

R represents
A, $-O-(CF_2)_a A$, $-O-(CF_2-CF-O)_b-(CF_2)_c-A$, or
            |
            $CF_3$ $-(CF_2)_c A$.
a=2 to 4;
b=0 or 1 to 5;
c=1 to 5;
A= —COOM; M:H, or alkali metal such as Na, K.
(p+q)/r=0.5-19 preferably 1-10.
such as;

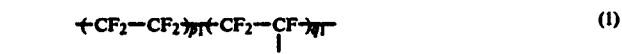 (1)

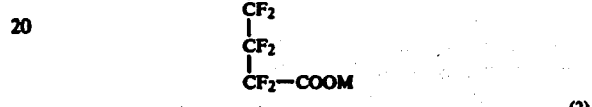 (2)

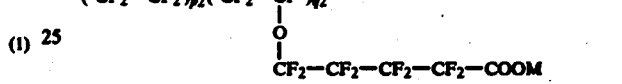 (3)

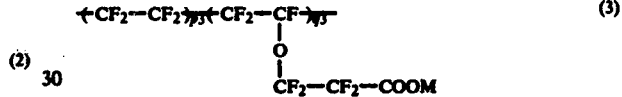 (4)

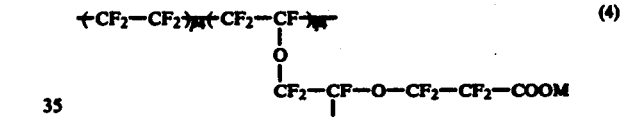 (5)

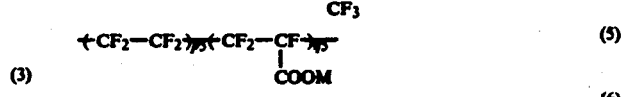 (6)

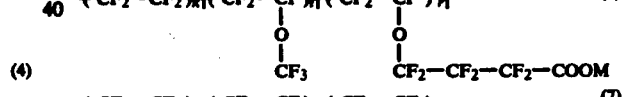 (7)

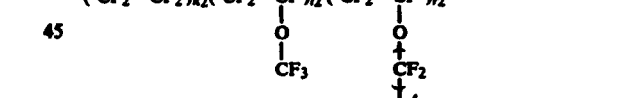 (8)

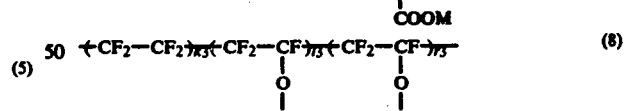 (9)

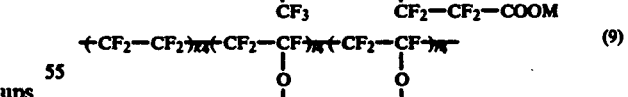 (10)

The copolymer have preferably carboxylic groups at a ratio of one per 220 to 2700 of the molecular weight.

(C) Sulfonic acid and carboxylic acid type fluorinated polymers

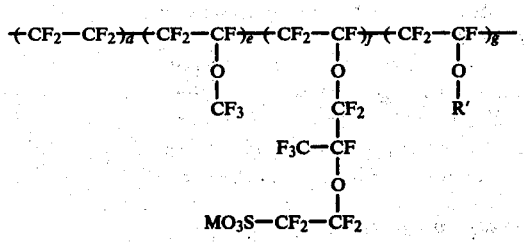

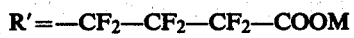

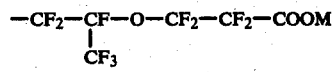

M=H, or alkali metal such as Na, K.
(d+e)/f=0.5–17 preferably 1–13;
(d+e)/g=0.3–14 preferably 0.8–8;
f/g=0.2–2.2 preferably 0.25–1.8.
such as;

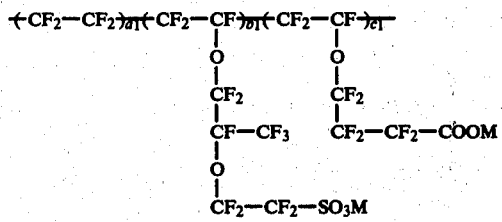
(1)

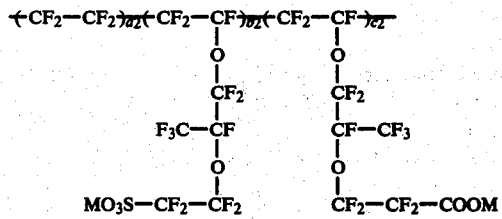
(2)

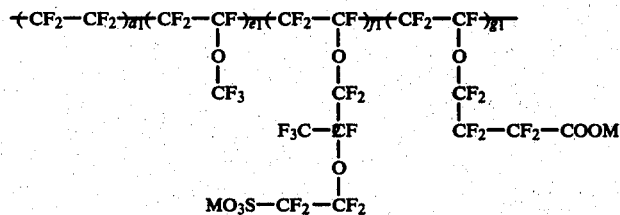
(3)

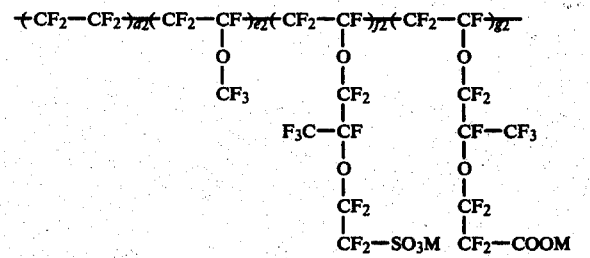
(4)

The copolymer have preferably sulfonic acid groups at a ratio of one per 200 to 4300 of the molecular weight and carboxylic groups at a ratio of one per 480 to 2600 of the molecular weight.

These examples of the units for the fluorinated polymers having cation-exchangeable groups are only schematic illustrations and the combinations of the units can be decided by the copolymerizations of the monomers. The typical monomers are as follows Monomers having a cation-exchangeable group or a functional group which can be converted to cation-exchangeable group.

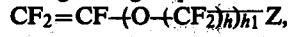

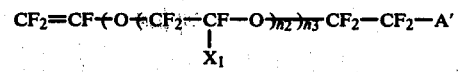

$Z = -CN, -COF, -COOH, -COOR_1, -COOM$
or $-CONR_2R_3$
$R_1 = C_1-C_{10}$ alkyl group;
$R_2, R_3 = H$, or $R_1$;
M=alkali metal;
$A' = -SO_2X', -COX'$;
$X' = F$ or $-OY$;
$Y = H, M, NH_4$, or $R_1$;
$X_1 = F, -CF_3$ or $-CF_2-O-CF_3$;

h=2 to 12;
$h_1 = 0$ or 1; $h_2 = 0$ or 1 to 5; $h_3 = 0$ or 1;
$h_4 = 1$ to 5.

Monomers which have not a cation-exchangeable group or a functional group being converted to a cation-exchangeable group and can be copolymerized with said monomer.

$CF_2=CF_2$
$CF_2=CF—CF_3$ $CF_2=CF—O(CF_2—CF—O)_i R_f'$
$\quad\quad\quad\quad\quad\quad\quad\quad |$
$\quad\quad\quad\quad\quad\quad\quad\quad X_1$ $CF_2=CF—C—R_f'$
$\quad\quad\quad\quad ||$
$\quad\quad\quad\quad O$ $R_f' = —C_6F_5, —CF_2X''$
$X_1 = F, —CF_3, —CF_2—O—CF_3;$
$X'' = —F$ or $C_1$-$C_5$ perfluoroalkyl group;
$R_f' = C_1$-$C_5$ perfluoroalkyl group;
$i = 0$ or 1 to 5.

$CF_3NO$ $\quad CF_2\!\!—\!\!\!—C=CF_2$
$\quad\quad \backslash\quad /$
$\quad\quad\quad CF_2$ Suitable typical fluorinated monomers include A group $CF_2=CF—O—CF_2—CF_2—SO_2F;$ $CF_2=CF—O—CF_2—CF—O—CF_2—CF_2—SO_2F;$
$\quad\quad\quad\quad\quad\quad\quad\quad\quad |$
$\quad\quad\quad\quad\quad\quad\quad\quad\quad CF_3$ $CF_2=CF—O—CF_2—CF—O—CF_2—CF—O—CF_2—CF_2—SO_2F;$
$\quad\quad\quad\quad\quad\quad\quad\quad\quad |\quad\quad\quad\quad\quad\quad |$
$\quad\quad\quad\quad\quad\quad\quad\quad\quad CF_3\quad\quad\quad\quad\quad CF_3$ $CF_2=CF—CF_2—CF_2—SO_2F;$ $CF_2=CF—O—CF_2—CF—O—CF_2—CF_2—SO_2F$
$\quad\quad\quad\quad\quad\quad\quad\quad\quad |$
$\quad\quad\quad\quad\quad\quad\quad\quad\quad CF_2$
$\quad\quad\quad\quad\quad\quad\quad\quad\quad |$
$\quad\quad\quad\quad\quad\quad\quad\quad\quad O—CF_3$ B group $CF_2=CF—O—CF_2—CF_2—COF;$
$CF_2=CF—O—CF_2—CF_2—CF_2—COF;$
$CF_2=CF—O—CF_2—CF_2—CF_2—CF_2—COOCH_3$ $CF_2=CF—O—CF_2—CF—O—CF_2—CF_2—COF;$
$\quad\quad\quad\quad\quad\quad\quad\quad\quad |$
$\quad\quad\quad\quad\quad\quad\quad\quad\quad CF_3$ $CF_2=CF—COOCH_3;$
$CF_2=CF—O—CF_2—CF_2—CF_2—COOCH_3$ C group $CF_2=CF—CF_3;$
$CF_2=CF—O—CF_3;$
$CF_2=CF—O—CF_2—CF_3;$
$CF_2=CF_2;$
$CF_2=CF—O—CF_2—CF_2—CF_3$ The monomers in A group are used for introducing sulfonic acid groups. The monomers in B group are used for introducing carboxylic acid groups. The monomers in C group are used for copolymerization with the monomer in A group and/or B group.

The other cation-exchange membranes used in the present invention are prepared by the immersing method.

The followings are typical examples for preparing the cation-exchange membranes by the immersing method.

(1) One or more monomer in B group with or without the monomer in C group is absorbed in the sulfonic acid type cation-exchange membrane and is polymerized and hydrolyzed to introduce carboxylic acid groups.

Suitable monomers in B group include $CF_2=CF—O—CF_2—CF_2—CF_2—COF;$ $CF_2=CF—O—CF_2—CF—O—CF_2—CF_2—COF;$
$\quad\quad\quad\quad\quad\quad\quad\quad\quad |$
$\quad\quad\quad\quad\quad\quad\quad\quad\quad CF_3$ $CF_2=CF—O—CF_2—CF_2—CF_2—COOCH_3.$ Suitable monomers in C group include
$CF_2=CF_2;$
$CF_2=CF—O—CF_3;$
$CF_2=CF—O—CF_2—CF_3.$ (2) One or more monomer in A group with or without the monomer in C group is absorbed in the carboxylic acid type cation-exchange membrane and is polymerized and hydrolyzed to introduce sulfonic acid groups.

Suitable monomers in A group include $CF_2=CF—O—CF_2—CF—O—CF_2—CF_2—SO_2F$
$\quad\quad\quad\quad\quad\quad\quad\quad\quad |$
$\quad\quad\quad\quad\quad\quad\quad\quad\quad CF_3$ Suitable monomers in C group include
$CF_2=CF_2.$ These cation-exchange membranes can be reinforced with a reinforcing materials such as glass fiber cloth, polyester fiber cloth, fluorinated polymer fiber cloth for improving characteristics of the membrane. In the preparation of the reinforced membrane, the cloth can be inserted before or after the polymerization of the fluorinated monomers.

In the treatment, the cation-exchangeable groups can be sulfonic acid groups and/or carboxylic acid groups in free and also can be alkali metal salts or ammonium slats thereof.

The water miscible organic solvents used in the treatment of the present invention should swell the membrane treated and have more than 0.1 g/100 g $H_2O$ of a solubility to water and are preferably the organic solvents which rapidly swell the membrane and are easily vaporized to be removed from the membrane.

Suitable water miscible organic solvents include aliphatic monohydric alcohols such as methanol, ethanol, propanol, butanol; ketones such as acetone, methyl ethyl ketone, diethyl ketone; esters such as methyl acetate, ethyl acetate, propyl acetate; aliphatic ethers such as ethyl ether, propyl ether; tetrahydrofuran, dioxane and chloroform.

The organic solvents can be used as mixtures thereof. It is also possible to contain the other solvent which swells the membrane but does not affect for improving the characteristics of the membrane such as water.

In the swelling operation, the membrane is dipped in the water miscible organic solvent so as to be swollen.

The condition is not limited and can be the temperature from 0° C. to the boiling point of the solvent.

In the solvent removing operation, the organic solvent from the membrane can be removed by heating or drying under a gas flow of air, nitrogen gas or other inert gas, drying in vacuum or other conventional processes.

The cation-exchange membrane is usually swollen with the above-mentioned water miscible organic solvent and then, the solvent is removed from the membrane.

The degree of swelling which is a percentage of an increased weight of the swollen membrane to the weight of the dry membrane is more than 3 wt.%, preferably more than 5 wt.%.

It is preferable to remove the organic solvent by evaporating it under heating so as to complete the annealing of the membrane.

It is especially preferable to hold the membrane impregnating the organic solvent between a pair of smooth plates such as glass plates, polytetrafluoroethylene plates, stainless steel plates with or without wiping out the surface of the membrane and then to evaporate it under heating the swollen membrane so as to complete the annealing of the membrane and to hold the shape of the membrane without deformation.

The heat treatment for removing the organic solvent can be in a range of higher than the room temperature to 200° C. and preferably 60° to 150° C. because when it is too low, it takes a long time for removing the organic solvent whereas when it is too high, the electric resistance of the membrane may be increased.

A monomer with or without a crosslinking agent is immersed into the treated cation-exchange membrane and is polymerized it to obtain the object cation-exchange membrane.

Suitable monomers include styrene and styrene derivatives such as $\alpha$-methyl styrene, chlorostyrene, chloromethyl styrene, hydroxymethyl styrene; acrylic acid and salts and esters thereof; methacrylic acid and salts and esters thereof; maleic acid and salts and esters thereof; vinyl acetate, vinyl isocyanate, acrylonitrile, acrolein, vinyl chloride, vinylidene chloride, vinylidene fluoride, vinyl fluoride; $\alpha,\beta,\beta$-trifluorostyrene, tetrafluoroethylene, trifluorochloroethylene, hexafluoropropylene; divinyl benzene; butadiene derivatives such as 1-chlorobutadiene, 2-chlorobutadiene, 1-cyanobutadiene, butadiene-1-carboxylic acid; perfluoroalkyl perfluorovinyl ethers, or $CF_2=CF-O-R_f(R_f=C_1-C_5$ perfluoroalkyl group) such as trifluoromethyl perfluorovinyl ether; perfluorovinyl carboxylic acids and their derivatives, or $CF_2=CF+O+(CF_2)_n)_{n_1}Z$ (n=2-4; $n_1=0$ or 1; Z=COOH, CN, COF or COOR (R=$C_1-C_5$ alkyl group) such as perfluoroacrylic acid, methyl perfluoro-6-oxa-7-octenoate, methyl perfluoro-5-oxa-6-heptenoate, perfluoro-6-oxa-7-octenoyl fluoride, perfluoro-6-oxa-7-octenenitrile;

$CF_2=CF+O+(CF_2-CFX-O)_h)_{h_1}(CF_2-CF_2)_{h_2}B$
(h=0, or 1-5; $h_1=0$ or 1; B=$SO_2F$, $SO_3H$, COF, $COOR^1$($R^1=C_1-C_5$ alkyl group); X=F, $CF_3$; $h_2=0$ or 1) such as perfluorovinyl sulfonyl fluoride, perfluoro(3,6-dioxa-4-methyl-7-octenesulfonyl fluoride).

More than two monomers from these monomers can be used simultaneously.

The monomer with or without a crosslinking agent such as divinyl benzene and a radical initiator is immersed into the treated membrane by dipping in the monomer or coating on the membrane.

The temperature for immersing is in a range of $-20°$ to 100° C. preferably 10° to 90° C. The time for dipping is in a range of 5 minutes to 50 hours.

The polymerization of the monomer in the cation-exchange membrane is in a range of $-20°$ to 200° C. When the monomer is gaseous material at the room temperature, the monomer can be liquefied under pressure or cooling for the immersing and the monomer can be immersed in the vapor pressure of the monomer before the polymerization.

When the monomer can introduce cation-exchangeable group or functional group which is convertible to cation-exchangeable group, the monomer is immersed and polymerized and the functional groups can be converted into cation-exchangeable groups.

The monomer can be mixed in a solvent such as alcohols e.g. methanol, ethanol; ethers e.g. diethyl ether, tetrahydrofuran, dioxane, chloroform, dimethylsulfoxide, dimethyl formamide etc. if necessary.

The monomer immersed into the membrane by the dipping or coating process can be polymerized by the heat polymerization; the radical polymerization; the cation polymerization in sulfuric acid; the photopolymerization in the presence of a sensitizer e.g. benzophenone, the radiation-induced polymerization by $\gamma$-rays or electron rays, etc.

When the resulting cation-exchange membrane is swollen with a water miscible organic solvent and then, the solvent is removed from the membrane, the effect is further improved. The water miscible organic solvents can be the above-mentioned ones.

The degree of swelling which is a percentage of an increased weight of the swollen membrane to the weight of the dry membrane is more than 3 wt.%, preferably more than 5 wt.%. The degree of swelling can be controlled by selecting the types and amounts of the monomer and the solvent.

The swelling treatment can be carried out at 0° C. to a boiling point of the solvent and can be the room temperature.

The solvent can be removed from the membrane by a heat treatment, a drying method by flowing air, nitrogen gas or the other inert gas or a vacuum drying method. In the heat treatment, it is preferable to hold the membrane between a pair of smooth plates such as glass plates, polytetrafluoroethylene plates, stainless steel plates, and then, to evaporate the solvent under heating the swollen membrane at the room temperature to 200° C., preferably the room temperature to 150° C.

The permeability of hydroxyl group ions through the cation-exchange membrane is lowered by the treatment of the present invention.

In usual, the fluorinated polymers having no functional group are water-repellent and oil-repellent. The base of the membrane may have the tendency of water-repellent and oil-repellent. However, the affinity of the membrane to the water miscible organic solvent is increased because of the high hydrophylic property of the cation-exchangeable groups in the membrane whereby the membrane is swollen. When the solvent is removed from the swollen membrane, the arrangement of the base cation-exchangeable groups is affected to effectively decrease the permeation of hydroxyl group ions.

The base cation-exchange membrane is non-crosslinking type whereby the arrangement of the cation-exchangeable groups is easily changed during a long time operation because of swelling. Accordingly, it is preferable to fix the desired arrangement of the base cation-exchangeable groups.

When the monomer is immersed into the membrane and is polymerized, the molecules of the base membrane are bonded to the molecules of the resulting polymer in the condition of certain crosslinkage. Accordingly, the cation-exchangeable groups are fixed in the desired arrangement which will not be easily changed. However, a part of the desired arrangement of the cation-exchangeable groups is changed by the treatment. Accordingly, it is preferable to treat the resulting membrane by the treatment with the water miscible organic solvent so as to arrange the cation-exchangeable groups in desired arrangement.

The present invention will be further illustrated by certain examples.

In the examples, the cation transport number of the membrane was measured by the Nernst's formula from membrane potential between 0.5 N-NaOH and 2.5 N-NaOH.

The electric resistance of the membrane was measured by the AC bridge method at 1000 C/S in 2.0% aqueous solution of sodium hydroxide.

EXAMPLE 1

A cation-exchange membrane having a thickness of 0.25 mm and a structure

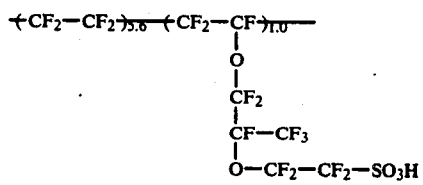

was used.

The cation-exchange membrane can be prepared by copolymerizing tetrafluoroethylene and a monomer

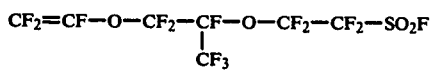

and molding the resulting copolymer and hydrolyzing it.

The electric resistance of the membrane was 2.0 $\Omega cm^2$ and the cation transport number of the membrane was 82%.

The cation-exchange membrane was dipped into ethanol at the room temperature for one day and it was dried in vacuum to remove ethanol from the membrane. The swollen cation-exchange membrane was dipped in a mixture of 60 wt. parts of styrene and 40 wt. parts of divinyl benzene at 25° C. for 4 hours.

After dipping it, the cation-exchange membrane was taken out and the surface of the membrane was wiped off and the membrane was held between a pair of glass plates and the membrane was heated at 80° C. for 20 hours to polymerize the monomers.

The resulting membrane was dipped into ethanol for 24 hours and it was dried to obtain a cation-exchange membrane.

The electric resistance of the treated membrane was measured by the AC bridge method at 1000 C/S in 2% aqueous solution of sodium hydroxide at 25° C. to give 4.2 $\Omega cm^2$. (The electric resistance in Examples were measured by the method). The cation transport number of the treated membrane was measured to give 95%.

The non-swollen membrane was dipped in a mixture of 60 wt. parts of styrene and 40 wt. parts of divinyl benzene and the monomers were polymerized in the same method.

The electric resistance and the cation transport number of the treated membrane were measured to give 4.1 $\Omega cm^2$ and 92%, respectively.

EXAMPLE 2

In accordance with the process of Example 1, the untreated cation-exchange membrane was treated with ethanol and the swollen membrane was dipped into a mixture of 5 wt. parts of p-hydroxymethyl styrene and 95 wt. parts of divinyl benzene, at 25° C. for 1 hour. After dipping it, the cation-exchange membrane was taken out and the surface of the membrane was wiped off and the membrane was held between a pair of glass plates and the membrane was heated at 80° C. for 20 hours to polymerize the monomers.

The resulting membrane was dipped into ethanol for 24 hours and it was dried to obtain a cation-exchange membrane.

The electric resistance and the cation transport number of the treated membrane was measured to give 4.0 $\Omega cm^2$ and 97%, respectively.

The non-swollen membrane was dipped in a mixture of 5 wt. parts of p-hydroxymethylstyrene and 95 wt. parts of divinyl benzene. The polymerization was in the same method.

The electric resistance and cation transport number of the treated membrane were measured to give 4.3 $\Omega cm^2$ and 95%, respectively.

EXAMPLE 3

The untreated cation-exchange membrane of Example 1 was dipped into chloroform at 25° C. for 24 hours to swell it and chloroform was removed from the membrane in vacuum. The swollen membrane was dipped into divinyl benzene at 25° C. for 2 hours.

In accordance with the process of Example 1, the membrane was treated to polymerize the monomer and to obtain a cation-exchange membrane.

The electric resistance and the cation transport number of the treated membrane were measured to give 4.0 $\Omega cm^2$ and 94%, respectively.

When the non-swollen membrane was dipped in the monomer and the monomer was polymerized by the same method to obtain a cation-exchange membrane, the electric resistance and the cation transport number of the treated membrane were measured to give 4.7 $\Omega cm^2$ and 93%, respectively.

EXAMPLE 4

The untreated cation-exchange membrane of Example 1 was dipped into methanol under refluxing for 8 hours, and methanol was removed from the membrane in vacuum.

The swollen membrane was dipped into a mixture of 3 wt. parts of p-hydroxymethyl styrene and 97 wt. parts of divinyl benzene at 25° C. for 90 minutes.

After dipping it, the membrane was taken out and the surface of the membrane was wiped off and the membrane was held between a pair of glass plates and the membrane was heated at 80° C. for 20 hours to polymerize the monomers.

The electric resistance and cation transport number of the treated membrane were measured to give 4.3 $\Omega cm^2$ and 98%, respectively.

When the non-swollen membrane was dipped in the monomer and the monomer was polymerized by the same method to obtain a cation-exchange membrane, the electric resistance and the cation transport number of the treated membrane were measured to give 4.2 $\Omega cm^2$ and 96%.

EXAMPLE 5

In accordance with the process of Example 1 except polymerizing the monomers at 20° C. by irradiating γ-rays at a rate of 1 M rad/hr. for 15 hours, the cation-exchange membrane was prepared.

The electric resistance and the cation transport number of the treated membrane were 4.4 $\Omega cm^2$ and 96%, respectively.

The same treatment was repeated except using the non-swollen cation-exchange membrane.

The electric resistance and the cation transport number of the treated membrane were 4.5 $\Omega cm^2$ and 93%, respectively.

EXAMPLE 6

The untreated cation-exchange membrane of Example 1 was dipped into ethanol under refluxing for 8 hours. Ethanol was removed from the membrane in vacuum.

The swollen membrane was dipped into 15 wt.% solution of butadiene-1-carboxylic acid in ether at 25° C. for 5 hours. After dipping it, the membrane was taken out and the surface of the membrane was wiped off and the membrane was held between a pair of glass plates and the monomer was polymerized at 80° C. for 20 hours.

The resulting membrane was dipped into ethanol for 24 hours and it was dried to obtain a cation-exchange membrane.

The electric resistance and the cation transport number of the treated membrane were 3.5 $\Omega cm^2$ and 97%, repsectively.

The same treatment was repeated except using the non-swollen cation-exchange membrane.

The electric resistance and the cation transport number of the treated membrane were 3.4 $\Omega cm^2$ and 95%, respectively.

EXAMPLES 7 AND 8; REFERENCES 1 AND 2

An electrolytic cell having 30 cm×30 cm of effective area was prepared by using the cation-exchange membrane as the diaphragm for partitioning an anode compartment and a cathode compartment.

An aqueous solution having 310 g/l of concentration was fed to the anode compartment at a rate of 7418 g per hour and water was fed to the cathode compartment so as to give 20% of the concentration of sodium hydroxide at the outlet of the cathode compartment and the electrolysis was carried out by feeding 180 amp. of current.

In the stable operation, 20% aqueous solution of sodium hydroxide was obtained at a rate of 1235 g per hour and water was fed to the anode compartment at a rate of 960 g per hour. The current efficiency to sodium hydroxide was as follows:

| | Cation-exchange membrane | Current efficiency (%) |
|---|---|---|
| Example 7 | Treated membrane prepared by polymerizing on swollen membrane in Example 1. | 81 |
| Reference 1 | Treated membrane prepared by polymerizing on non-swollen membrane in Example 1. | 73 |
| Example 8 | Treated membrane prepared by polymerizing on swollen membrane in Example 2. | 93 |
| Reference 2 | Treated membrane prepared by polymerizing on non-swollen membrane in Example 2. | 87 |

EXAMPLE 9

The untreated cation-exchange membrane of Example 1 was dipped into ethanol at the room temperature for one day, and the membrane was taken out and held between a pair of glass plates and it was heated at 85° C. for 24 hours.

The swollen membrane was dipped into a mixture of styrenedivinyl benzene (60:40) at 25° C. for 4 hours. After dipping it, the membrane was taken out and the surface of the membrane was wiped off and the membrane was held between a pair of glass plates and it was heated at 80° C. for 20 hours to polymerize the monomers.

The resulting membrane was dipped into ethanol for 24 hours and it was dried to obtain a cation-exchange membrane.

The electric resistance and the cation transport number of the treated membrane were 4.2 $\Omega cm^2$ and 96.5%, respectively. (Reference: see Example 1).

EXAMPLE 10

The untreated cation-exchange membrane of Example 1 was swollen in the same method.

The swollen membrane was dipped into a mixture of 3 wt. parts of p-hydroxymethyl styrene and 97 wt. parts of divinyl benzene at 25° C. for 50 minutes. After dipping it, the membrane was taken out and the surface of the membrane was wiped off and the membrane was held between a pair of glass plates and it was heated at 80° C. for 20 hours to polymerize the monomers.

The resulting membrane was dipped into ethanol for 24 hours and was dried to obtain a cation-exchange membrane.

The electric resistance and the cation transport number of the treated membrane were 3.3 $\Omega cm^2$ and 98%, respectively.

The same treatment was repeated except using the non-swollen cation-exchange membrane.

The electric resistance and the cation transport number of the treated membrane were 4.2 $\Omega cm^2$ and 96%, respectively.

EXAMPLE 11

The untreated cation-exchange membrane of Example 1 was dipped into ethanol under refluxing for 8 hours. The membrane was taken out and it was held between a pair of glass plates and it was heated at 85° C. for 24 hours.

In accordance with Example 10, the swollen membrane was dipped into the monomers and treated to obtain a cation-exchange membrane.

EXAMPLE 12

The untreated cation-exchange membrane of Example 1 was dipped into chloroform at 25° C. for 24 hours to swell it. The membrane was taken out and it was held between a pair of glass plates and it was heated at 85° C. for 24 hours.

The swollen membrane was dipped into divinyl benzene at 25° C. for 2 hours. After dipping it, the membrane was taken out and the surface of the membrane was wiped off and the membrane was held between a pair of glass plates and it was heated at 80° C. for 20 hours to polymerize the monomer.

The electric resistance and the cation transport number of the treated membrane was 4.0 $\Omega cm^2$ and 96%, respectively. (Reference: see Example 3)

EXAMPLE 13

A teflon fiber reinforced cation-exchange membrane having two layers of A and B was used.
A layer: thickness of 0.05 mm
  structure

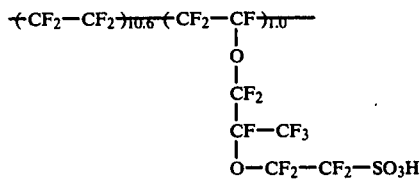

B layer: thickness of 0.10 mm
  structure

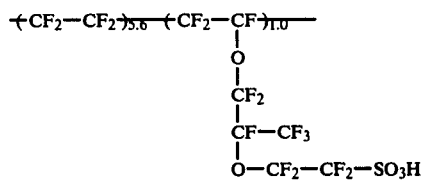

The cation-exchange membrane was dipped into methanol under refluxing for 5 hours and the membrane was taken out and it was held between a pair of glass plates and it was heated at 85° C. for 24 hours.

The swollen membrane was dipped into 6 wt.% solution of butadiene-1-carboxylic acid in ether. After dipping it, the membrane was taken out and the surface of the membrane was wiped off and the membrane was held between a pair of glass plates and it was heated at 80° C. for 20 hours to polymerize the monomer to obtain a cation-exchange membrane.

The electric resistance and the cation transport number of the treated membranw were 6.0 $\Omega cm^2$ and 98%, respectively.

When the non-swollen membrane was used, the electric resistance and the cation transport number of the treated membrane were 6.8 $\Omega cm^2$ and 96.2%, respectively. When the non-swollen membrane itself was used, the current efficiency was 92%, and the electric resistance was 6.8 $\Omega cm^2$.

EXAMPLES 14 TO 16; REFERENCES 3 TO 5

In accordance with the process of Examples 7 and 8, except using the cation-exchange membranes shown in the following table, the current efficiencies to the production of sodium hydroxide were tested. The results are as follows.

| | Cation-exchange membrane | Current efficiency (%) |
|---|---|---|
| Example 14 | Treated membrane prepared by polymerizing on swollen membrane in Example 9 | 88 |
| Reference 3 | Treated membrane prepared by polymerizing on non-swollen membrane in Example 1 | 73 |
| Example 15 | Treated membrane prepared by polymerizing on swollen membrane in Example 10 | 95 |
| Reference 4 | Treated membrane prepared by polymerizing on non-swollen membrane in Example 10 | 90 |
| Example 16 | Treated membrane prepared by polymerizing on swollen membrane in Example 13 | 95 |
| Reference 5 | Treated membrane prepared by polymerizing on non-swollen membrane in Example 13 | 91 |

EXAMPLE 17

The untreated cation-exchange membrane of Example 1 was dipped into methanol for 50 minutes to swell it. The membrane was held between a pair of glass plates and it was heated at 90° C. for 3 hours.

The membrane and perfluoropropyl perfluorovinyl ether were charged into an autoclave and azobisisobutyronitrile as an initiator was added to it. Then, tetrafluoroethylene was added and they were heated to polymerize it to obtain a cation-exchange membrane.

In accordance with the process of Example 7 except using the cation-exchange membrane, the current efficiency was measured to give 89%.

When the cation-exchange membrane prepared by using non-swollen membrane was used, the current efficiency was 82%.

EXAMPLE 18

A copolymer of tetrafluoroethylene and a monomer having the formula
  $CF_2=CF-O+CF_2)_3COOCH_3$
was molded in a form of membrane and then, it was hydrolyzed to obtain a carboxylic acid type cation-exchange membrane (thickness: 0.2 mm).

The membrane had a structure

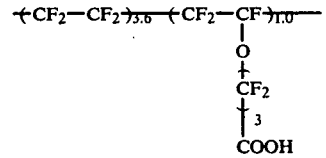

The membrane was dipped into ethanol for 30 hours and the membrane was held between a pair of glass plates and it was heated at 95° C. for 4 hours.

The membrane and perfluoropropyl perfluorovinyl ether were charged into an autoclave, and azobisisobutyronitrile as an initiator was added to it.

Then, tetrafluoroethylene was added and they were heated to polymerize it to obtain a cation-exchange membrane.

In accordance with the process of Example 7 except using the cation-exchange membrane, the current efficiency was measured to give 97%.

When the cation-exchange membrane prepared by using non-swollen membrane was used, the current efficiency was 93%.

When the non-swollen membrane itself was used, the current efficiency was 89%.

EXAMPLE 19

A terpolymer of tetrafluoroethylene and a monomer having the formula
$$CF_2=CF-O+CF_2)_3COOCH_3$$
and a monomer

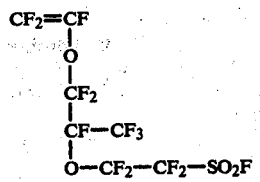

was molded in a form of membrane and it was hydrolyzed to obtain a sulfonic acid-carboxylic acid type cation-exchanged membrane (thickness: 0.19 mm).

The membrane had a structure

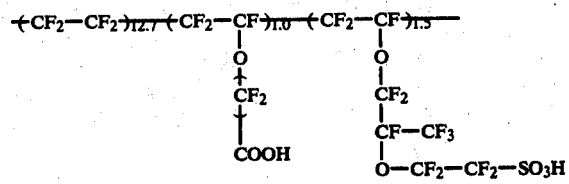

The membrane was dipped into methanol for 30 hours and the membrane was held between a pair of glass plates and it was heated at 95° C. for 4 hours.

The membrane and $CF_2=CF-O+CF_2)_3COOCH_3$ were charged into an autoclave and azobisisobutyronitrile as an initiator was added. Then, tetrafluoroethylene was added and they were heated to polymerize them and it was hydrolyzed to obtain a cation-exchange membrane.

In accordance with the process of Example 7 except using the cation-exchange membrane, the current efficiency was measured to give 96%.

When a cation-exchange membrane prepared by using non-swollen membrane, was used, the current efficiency was 92%.

When the non-swollen membrane itself was used, the current efficiency was 87%.

EXAMPLE 20

A cation-exchange membrane of Example 1 was dipped into methanol at the room temperature for 10 minutes to swell the membrane. The swollen membrane was held between a pair of glass plates and it was heated at 80° C. for 2 hours. The treated membrane was put into an autoclave and 20 wt. parts of perfluoropropyl perfluorovinyl ether and 0.3 wt. part of azobisisobutyronitrile were charged and then, tetrafluoroethylene was fed. The autoclave was gradually heated to 75° C. and the polymerization was carried out for 5 hours. The resulting cation-exchange membrane was dipped into methanol at the room temperature for 1 hour and then, the swollen membrane was held between a pair of glass plates and it was heated at 80° C. for 20 hours to remove methanol.

The current efficiency measured by the method of Example 7 was 94% after the swelling treatment whereas it was 82% before the swelling treatment.

EXAMPLES 21 TO 24

In accordance with the process of Example 20 except using ethanol, ethyl acetate, tetrahydrofuran or chloroform instead of methanol, the cation-exchange membrane was treated by swelling with the solvent, impregnating the monomer and polymerizing it and swelling with solvent and removing the solvent to obtain the object cation-exchange membranes.

The current efficiencies of the membranes measured by the method of Example 7 were as follows.

|  | Organic solvent | Current efficiency (%) |
|---|---|---|
| Example 21 | ethanol | 96 |
| Example 22 | ethyl acetate | 94 |
| Example 23 | tetrahydrofuran | 95 |
| Example 24 | chloroform | 95 |

EXAMPLE 25

The cation-exchange membrane of Example 1 was dipped into methanol for 24 hours to swell it and then, methanol was removed from the membrane in vacuum.

In accordance with the process of Example 20, perfluoropropyl perfluorovinyl ether and tetrafluoroethylene were impregnated into the membrane and polymerized.

The resulting membrane was dipped into methanol for 30 minutes and the swollen membrane was held between a pair of glass plates and was heated at 85° C. for 5 hours.

The current efficiency measured by the method of Example 7 was 93%.

EXAMPLE 26

The cation-exchange membrane of Example 1 was dipped into ethanol at the room temperature for 24 hours to swell it and then, ethanol was removed in vacuum.

In accordance with the process of Example 20, perfluoropropyl perfluorovinyl ether and tetrafluoroethylene were impregnated into the membrane and polymerized.

The resulting membrane was dipped into ethanol for 30 minutes and then ethanol was removed from the membrane in vacuum.

The current efficiency measured by the method of Example 7 was 92%.

EXAMPLE 27

A teflon fiber reinforced cation-exchange membrane having two layers of A and B was used.
A layer: thickness of 0.025 mm
 structure

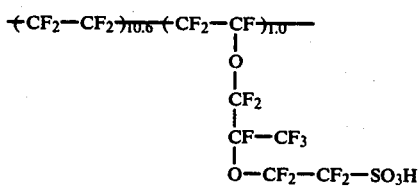

B layer: thickness of 0.125 mm
structure

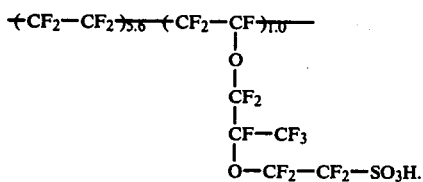

The cation-exchange membrane was dipped into methanol at the room temperature for 24 hours to swell the membrane. The swollen membrane was held between a pair of glass plates and it was heated at 80° C. for 5 hours.

The treated membrane was put into an autoclave and 20 wt. parts of $CF_2=CF-O-(CF_2)_3COOCH_3$ and 0.4 wt. part of azobisisobutyronitrile were charged and then, tetrafluoroethylene was fed. The polymerization was carried out at 75° C. for 6 hours.

The resulting cation-exchange membrane was dipped into methanol at the room temperature for 3 hours and then, the swollen membrane was held between a pair of glass plates and it was heated at 80° C. for 15 hours. The ester of the polymer in the membrane was hydrolyzed to carboxylic acid.

The current efficiency measured by the method of Example 7 except obtaining about 25% of the concentration of sodium hydroxide, was 90% after the swelling treatment with hydrolysis whereas it was 85% before the swelling treatment with hydrolysis. When the non-swollen membrane itself was used, the current efficiency was 75%.

EXAMPLE 28

The cation-exchange membrane of Example 19 was used.

The membrane was dipped into methanol at the room temperature for 24 hours and the swollen membrane was held between a pair of glass plates and was heated at 80° C. for 10 hours.

In accordance with the process of Example 27, $CF_2=CF-O-(CF_2)_3COOCH_3$ and $CF_2=CF_2$ were impregnated into the membrane and polymerized.

The resulting membrane was dipped into methanol for 4 hours and then, the swollen membrane was held between a pair of glass plates and was heated at 80° C. for 10 hours. The ester of the polymer in the membrane was hydrolyzed to carboxylic acid.

The current efficiency measured by the method of Example 27 was 94% after the swelling treatment with hydrolysis whereas it was 90% before the swelling treatment with hydrolysis.

EXAMPLE 29

The cation-exchange membrane of Example 18 was used.

The membrane was dipped into methanol at the room temperature for 24 hours and the swollen membrane was held between a pair of glass plates and was heated at 80° C. for 24 hours.

In accordance with the process of Example 20, $CF_2=CF-O-CF_2CF_2CF_3$ and $CF_2=CF_2$ were impregnated into the membrane and polymerized.

The resulting membrane was dipped into methanol at the room temperature for 24 hours and then, the swollen membrane was held between a pair of glass plates and was heated at 80° C. for 24 hours.

The current efficiency measured by the method of Example 27 was 96% after the swelling whereas it was 91% before the swelling.

What is claimed is:

1. A process for preparing cation-exchange membranes which comprises:
    swelling a fluorinated polymer membrane containing cation exchangeable groups with a water miscible organic solvent such that the weight of the swollen membrane is at least 3 wt.% greater than that of dry membranes;
    vaporizing essentially all of said solvent from said swollen membrane;
    immersing said swollen membrane in a monomer with or without a cross-linking agent and a polymerization initiator for from about 5 minutes to about 50 hours at $-20°$ to about 100° C.; and
    polymerizing the monomer.
2. The process claim 1, wherein said organic solvent is a water miscible organic solvent which is miscible to water at least 0.1 g/100 g $H_2O$ of solubility.
3. The process claim 1, wherein said organic solvent is removed in vacuum.
4. The process claim 1, wherein said organic solvent is removed by heating in the atmospheric pressure.
5. The process claim 1, wherein a monomer is immersed into said membrane after treating it by swelling it with said organic solvent and removing said organic solvent, by a dipping or coating process, and said immersed monomer is polymerized.
6. The process claim 1, wherein said monomer is dissolved in an organic solvent with or without a cross-linking agent.
7. The process claim 1, wherein said polymerization is performed by a heat polymerization, a radical polymerization, a photopolymerization or a radiation-induced polymerization.
8. The process claim 1, wherein said cation-exchange membrane prepared by immersing said monomer and polymerizing said monomer, is swollen with a water miscible organic solvent and removing said organic solvent from the membrane.
9. The process claim 1, wherein said water miscible organic solvent is an aliphatic monohydric alcohol, a ketone, an ester, an aliphatic ether, dioxane or chloroform.
10. The membrane prepared by the process of claim 1.